United States Patent [19]

Ishima

[11] Patent Number: 4,555,713

[45] Date of Patent: Nov. 26, 1985

[54] POWER SOURCE DEVICE FOR INK JET PRINTER

[75] Inventor: Kazumi Ishima, Kashiwa, Japan

[73] Assignee: Ricoh Company, Ltd., Tokyo, Japan

[21] Appl. No.: 601,472

[22] Filed: Apr. 18, 1984

[30] Foreign Application Priority Data

Apr. 20, 1983 [JP] Japan .................................. 58-69540

[51] Int. Cl.⁴ ............................................ G01D 15/18

[52] U.S. Cl. ............................................ 346/75

[58] Field of Search ...................... 346/75; 363/21, 26, 363/41

[56] References Cited

U.S. PATENT DOCUMENTS

| | | | |
|---|---|---|---|
| 4,253,136 | 2/1981 | Nanko | 363/21 |
| 4,290,073 | 9/1981 | Jinnai et al. | 346/75 |
| 4,315,303 | 2/1982 | Snyder | 363/21 |
| 4,346,387 | 8/1982 | Hertz | 346/1.1 |

*Primary Examiner*—E. A. Goldberg

*Assistant Examiner*—Gerald E. Preston

*Attorney, Agent, or Firm*—David G. Alexander

[57] ABSTRACT

A power source circuit for a charge and deflection type ink jet printer which supplies deflection voltages to at least two separate deflection electrodes. The circuit performs a control such that output voltages of two shapers commonly connected to a secondary winding of a transformer are substantially equal to each other.

5 Claims, 4 Drawing Figures

POWER SOURCE DEVICE FOR INK JET PRINTER

BACKGROUND OF THE INVENTION

The present invention relates to a power source device for an ink jet printer which is of the type having a plurality of separate deflection electrodes and, more particularly, to one capable of supplying the respective deflection electrodes with voltages which are so controlled as to eliminate discharging across the separated deflection electrodes.

In a charge and deflection type ink jet printer, ink supplied to a head is ejected from a nozzle of the head to be separated into a drop at a predetermined position. A charging electrode is located at the position where the separation of the ink into a drop occurs and supplied with charging voltages to selectively charge the drops. The charged drops are deflected by a deflection electrode to impinge on a paper laid on a platen so as to print out characters and/or figures thereon. The other drops left uncharged by the charging electrode are collected by a gutter.

In an ink jet printer having such a construction, as the distance from the nozzle of the head to the recording surface on the platen increases, the influence of Coulomb force acting between adjacent drops, air resistance and the like becomes significant to cause distortions in the printed characters and pictures. While the distortions may be eliminated by reducing the distance between the nozzle of the head and the recording surface on the platen, such cannot be implemented unless a higher deflection voltage is applied across the deflection electrode. The higher deflection voltage, however, enhances the tendency toward distortions in deflection and leaks at the deflection electrode.

To solve the problem discussed above, there has been proposed and put to practical use a charge and deflection type ink jet printer in which the deflection electrode is divided into a plurality of deflection electrodes, such as two, and different deflection voltages are applied to the respective deflection electrodes. This type of ink jet printer furnished with two separate deflection electrodes is capable of suppressing distortions in deflection and, additionally, setting up considerable amounts of deflection.

However, the ink jet printer with two deflection electrodes requires at least two high-tension power source sets which proportionally add to the cost. Moreover, if the two deflection voltages do not build up or down equally to each other, the voltage across the deflection electrodes will be increased to invite a leak or, in the worst case, discharging. Such would damage other circuitries installed in the printer and/or entail malfunctions thereof.

SUMMARY OF THE INVENTION

It is therefore an object of the present invention to provide a power source device for a charge and deflection type ink jet printer which is furnished with a plurality of separate deflection electrodes.

It is another object of the present invention to provide a power source device for a charge and deflection type ink jet printer which eliminates discharging across a plurality of separate deflection electrodes.

It is another object of the present invention to provide a power source device for a charge and deflection type ink jet printer which supplies each of a plurality of separate deflection electrodes with controlled deflection voltages.

It is another object of the present invention to provide a generally improved power source device for a charge and deflection type ink jet printer.

In one aspect of the present invention, there is provided a power source device for a charge and deflection type ink jet printer which has at least a first deflection electrode and a second deflection electrode separate from the first deflection electrode, which device comprises a DC power source, a voltage control circuit for controlling an output voltage of the DC power source, a transformer for varying a magnitude of a controlled voltage supplied from the voltage control circuit to a primary winding and producing the varied controlled voltage from a secondary winding, a first shaper and a second shaper for individually rectifying and smoothing a voltage appearing at the second winding of the transformer and applying outputs of said first shaper and said second shaper to the first deflection electrode and the second deflection electrode as a first deflection voltage and a second deflection voltage respectively, and a discharging time constant control circuit for substantially equalizing discharging time constants of output voltages of the first shaper and the second shaper.

In another aspect of the present invention, there is provided a power source device which comprises a DC power source, a voltage control circuit for controlling an output voltage of the DC power source, a transformer for varying a magnitude of a controlled voltage supplied from the voltage control circuit to a primary winding and producing the varied controlled voltage from a secondary winding, a first shaper and a second shaper for individually rectifying and smoothing an output voltage which appears on the secondary winding of the transformer, and a discharging time constant control circuit for equalizing discharging time constants of output voltages of the first shaper and the second shaper.

The above and other objects, features and advantages of the present invention will become apparent from the following detailed description taken with the accompanying drawings.

DESCRIPTION OF THE PREFERRED EMBODIMENTS

While the power source device for an ink jet printer of the present invention is susceptible of numerous physical embodiments, depending upon the environment and requirements of use, substantial numbers of the herein shown and described embodiments have been made, tested and used, and all have performed in an eminently satisfactory manner.

Figure 1:
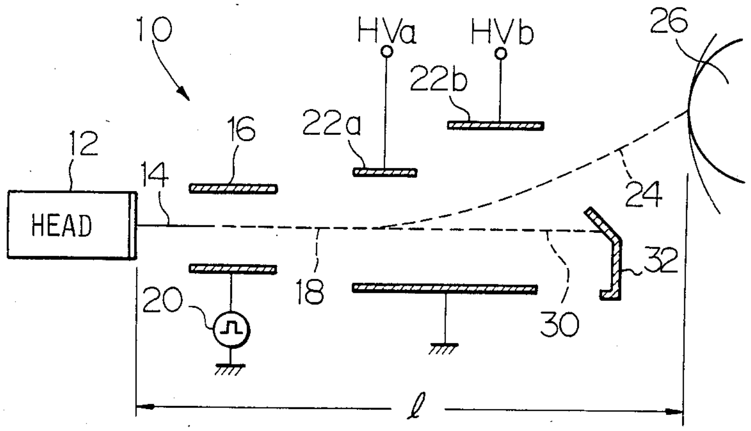
FIG. 1 is a schematic view of a charge and deflection type ink jet printer to which the present invention is applicable.

Referring to FIG. 1, a charge and deflection type ink jet printer to which the present invention is applicable is shown and generally designated by the reference numeral 10. In the printer 10, ink under pressure is ejected from a nozzle of a head 12 and the resulting jet of ink, 14, is separated into a drop 18 at a predetermined position ahead the nozzle. A charging electrode 16 charges the drop 18 in response to a charging voltage which is associated with a data signal to be printed out and supplied from a charging voltage source 20. The charged drops 18 are deflected by two coactive deflection electrodes *22a* and *22b* which are supplied with deflection voltages HVa and HVb respectively. The deflected drops, 24, impinge on a paper 28 on a platen 26 to print out characters and/or figures. Drops 30 which do not contribute to printing are caught by a gutter 32 to be returned to an ink reservoir (not shown).

The ink jet printer described above is capable of reducing distortions in deflection and achieving large amounts of deflection as previously stated, by applying the different deflection voltages HVa and HVb to the deflection electrodes *22a* and *22b* respectively. However, the supply of different deflection voltages HVa and HVb have to be implemented by two separate high-tension power source sets resulting in an increase in cost. Further, unless the two deflection voltages build up and down equally with each other, the voltage across the deflection electrodes *22a* and *22b* is unavoidably increased to invite a leak, or in the worst case, discharging, thereby destructing other circuitries and/or developing malfunctions.

Preferred embodiments of the present invention which are free from the drawback discussed above will be described with reference to the accompanying drawings.

Figure 2:
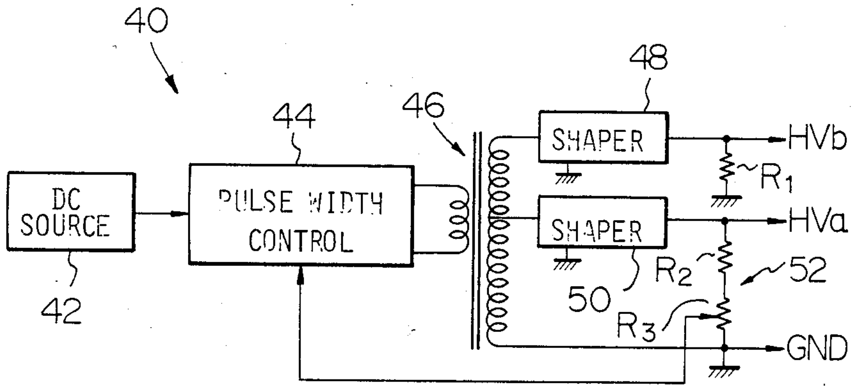
FIG. 2 is a circuit diagram representative of a power source device embodying the present invention.

Referring to FIG. 2, a power source device for a charge and deflection type ink jet printer embodying the present invention is shown and generally designated by the reference numeral 40. As shown, the power source device 40 comprises a DC power source 42, a pulse width control circuit 44 for varying the pulse width of a voltage output from the DC power source 42, a transformer 46 supplied with a voltage having the varied pulse width, and shapers 48 and 50 each being connected to ground and adapted to rectify and smooth a voltage which appears at the secondary winding of the transformer 46. For the shapers 48 and 50, use may be made of a voltage doubler with a view to reducing the boost ratio of the transformer 46 as well as the breakdown voltage. The output voltage of the shaper 48 is routed to the deflection electrode *22b* as a deflection voltage HVb, while the output voltage of the shaper 50 is routed to the other deflection electrode *22a* as a deflection voltage HVa.

A compensation resistor $R_1$, is connected between the output terminal of the shaper 48 and ground. A series connection 52 of a resistor $R_2$ and a variable resistor $R_3$ is connected between the output terminal of the shaper 50 and ground GND. The series connection 52 functions to detect a change in the output voltage of the shaper 50, i.e. a change in the deflection voltage HVa. The voltage detected by the series connection 52 is fed back to the pulse width control 44 so that the output voltage of the shaper 50 and, thereby, the deflection voltages HVa and HVb are controlled to predetermined values.

Figure 3:
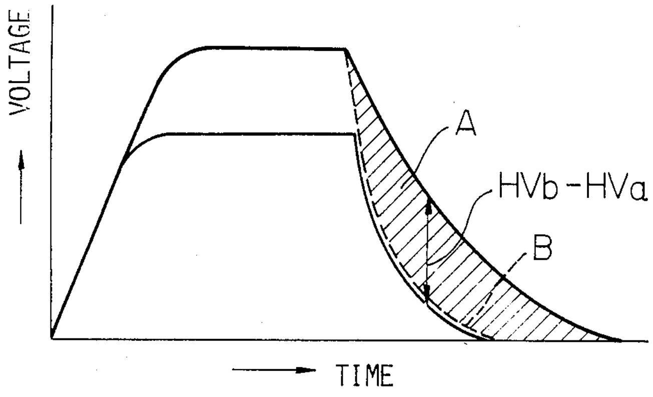
FIG. 3 is a plot demonstrating the operation of the power source device shown in FIG. 2.

As shown in FIG. 3, the power source device 40 in accordance with the present invention allows the two voltages HVa and HVb to build up substantially equally with each other. However, when the DC power source 42 is cut off, the voltages HVa and HVb are caused to fall in noticeably different manners; in terms of time, they develop a potential difference (HVb−HVa) as indicated by a hatched region A in FIG. 3, developing a spark or the like across the deflection electrodes *22a* and *22b*.

Usually, deflection electrodes have several hundreds to several thousands of megohms of insulation resistance because they are simply formed with air gaps. In contrast in the power source device 40 of the present invention, the resistor $R_2$ having a resistance of several tens to several hundreds of megohms is located at the voltage HVa side which introduces a substantial difference in discharging time constant between the voltages HVa and HVb. Thus, in the illustrative embodiment, the compensation resistor $R_1$ is inserted in the voltage HVb side to equalize the discharging time constants of the voltages HVa and HVb, thereby developing such a discharging waveform as one indicated by a dotted curve in FIG. 3.

Figure 4:
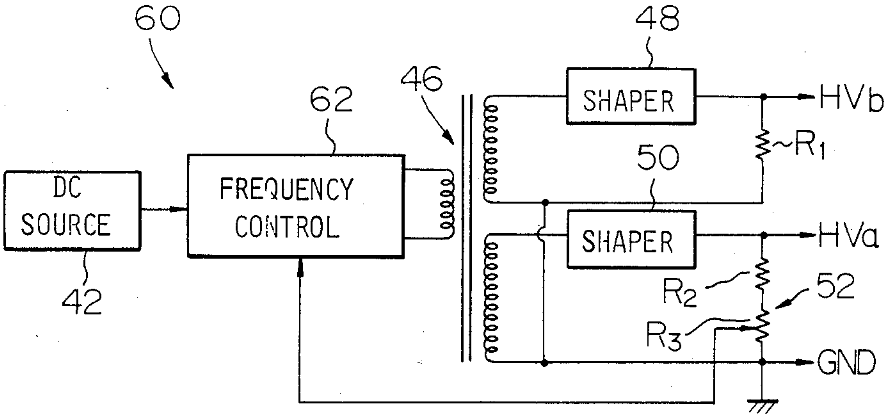
FIG. 4 is a circuit diagram representative of another embodiment of the present invention.

Referring to FIG. 4, a second embodiment of the present invention is shown. Again, the power source device, 60, is furnished with the DC power source 42, transformer 46, shapers 48 and 50, resistor $R_1$, and series connection 52 of the resistors $R_2$ and $R_3$. These circuit elements are common in function to those of the first embodiment and, therefore, detailed description thereof will be omitted for simplicity. The second embodiment shown in FIG. 4 is distinguishable from the first in that it changes the frequency of the output voltage of the DC power source and not the pulse width. For this purpose, the power source device 60 employs a frequency control circuit 62. The secondary winding of the transformer 46 in the second embodiment is used in a divided manner.

In the second embodiment, as has been the case with the first embodiment, the discharging time constants of the voltages HVa and HVb would be far different from each other if without the series circuit 52. The series connection 52 of the resistor $R_2$ and variable resistor $R_3$ as shown in FIG. 4 serves to equalize the discharging time constants of the voltages HVa and HVb, thereby eliminating sparks across the deflection electrodes *22a* and *22b* or the damage to other circuitries.

In summary, it will be seen that the present invention provides a power source device for an ink jet printer of the type having separate deflection electrodes which substantially equalizes the discharging time constants of deflection voltages which are respectively applied to the deflection electrodes, thereby freeing the separate deflection electrodes from discharging and other circuitries from damage even when a DC power source is cut off.

Various modifications will become possible for those skilled in the art after receiving the teachings of the present disclosure without departing from the scope thereof.

What is claimed is:

1.

A power source device for a charge and deflection type ink jet printer which has at least a first deflection electrode and a second deflection electrode separate from the first deflection electrode, comprising:

a DC power source;

a voltage control circuit for controlling an output voltage of said DC power source;

a transformer for varying a magnitude of a controlled voltage supplied from said voltage control circuit to a primary winding and producing the varied controlled voltage from a secondary winding;

a first shaper and a second shaper for individually rectifying and smoothing a voltage appearing at said secondary winding of said transformer and applying outputs of said first shaper and said second shaper to the first deflection electrode and the second deflection electrode as a first deflection voltage and a second deflection voltage respectively; and a discharging time constant control circuit for substantially equalizing discharging time constants of output voltages of the first shaper and the second shaper.

2. A power source device as claimed in claim 1, in which the voltage control circuit comprises a pulse width control circuit for varying a pulse width of the output voltage of the DC power source.

3. A power source device as claimed in claim 2, in which the discharging time constant control circuit comprises a first resistor connected between an output terminal of the second shaper and ground, and a series connection of a second resistor and a variable third resistor which is connected between an output terminal of the first shaper and ground.

4. A power source device as claimed in claim 1, in which the voltage control circuit comprises a frequency control circuit for varying a frequency of the output voltage of the DC power source.

5. A power source device as claimed in claim 4, in which the discharging time constant control circuit comprises a first resistor connected between an output terminal of the second shaper and ground, and a series connection of a second resistor and a variable third resistor which is connected between an output terminal of the first shaper and ground.

* * * * *